United States Patent [19]

Fulger et al.

[11] Patent Number: 4,656,040

[45] Date of Patent: * Apr. 7, 1987

[54] PROCESS FOR PREPARING AN ALL GRAIN, ENZYME-SACCHARIFIED CEREAL AND PRODUCT PRODUCED

[75] Inventors: Charles V. Fulger, Millwood; Ernest K. Gum, Granit Springs, both of N.Y.

[73] Assignee: General Foods Corporation, White Plains, N.Y.

[*] Notice: The portion of the term of this patent subsequent to Feb. 14, 2001 has been disclaimed.

[21] Appl. No.: 480,986

[22] Filed: Mar. 31, 1983

[51] Int. Cl.$^4$ ................................................ A23L 1/10
[52] U.S. Cl. ...................................... 426/18; 426/28; 426/31; 426/49
[58] Field of Search ............................ 426/18, 28, 31

[56] References Cited

U.S. PATENT DOCUMENTS

| | | | |
|---|---|---|---|
| 2,289,416 | 7/1942 | Fine et al. | 426/28 |
| 3,262,783 | 7/1966 | Blanchon | 426/31 |
| 3,336,137 | 8/1967 | Hickey | 426/28 |
| 3,420,671 | 1/1969 | Hess et al. | 426/28 |
| 4,254,150 | 3/1981 | Fritze et al. | 426/18 |
| 4,431,674 | 2/1984 | Fulger et al. | 426/462 |
| 4,435,430 | 3/1984 | Fulger et al. | 426/462 |

Primary Examiner—Sam Rosen
Attorney, Agent, or Firm—Thomas A. Marcoux; Thomas R. Savoie; Daniel J. Donovan

[57] ABSTRACT

A process is disclosed for producing an all-grain, enzyme-saccharified cereal derived from cereal grain components. The process involves saccharifying an endosperm fraction to form a syrup containing soluble saccharides and adding to the saccharified endosperm a matrix-forming ingredient which is either a modified bran material, a toasted ground germ or a combination of these two ingredients to form a cereal dough, and subsequently processing the cereal dough to obtain a ready-to-eat cereal.

15 Claims, No Drawings

PROCESS FOR PREPARING AN ALL GRAIN, ENZYME-SACCHARIFIED CEREAL AND PRODUCT PRODUCED

TECHNICAL FIELD

This invention relates to a novel breakfast cereal and process for producing same. More specifically, it relates to a sweet, all natural, enzymesaccharified, cereal derived from all grain cereal components.

BACKGROUND ART

Processes involving the enzymatic hydrolysis of starch to form monosaccharides, disaccharides, trisaccharides, and oligosaccharides are commonly known to the skilled food artisan. U.S. Pat. No. 4,254,150 issued to Fritze et al. entitled Process For Producing a Foodstuff of Cereal teaches a process to saccharify the starch contained in the cereal to form dextrose by enzymatic degradation of the starch in the cereal grain. In this enzymatic process, all the cereal substances, both those containing starch and those not containing starch are treated together. The foodstuff produced according to this invention is claimed to have a good flavor and the dextrose content thereof is absorbed directly as sugar by the body. While such a process will saccharify the starch content of the cereal grain it is difficult to produce a cereal dough of sufficient functionality because the starch which has been saccharified is no longer present in a sufficient quantity to provide the typical matrix forming properties contributed by the endosperm.

U.S. Pat. No. 4,282,319 issued to Conrad, teaches a process for preparing in situ, enzymatically hydrolyzed protein and starch products from whole grain comprising crushing the grain, enzymatically treating the crushed grain with first an endopeptidase to transform substantially all water-soluble proteins to peptides and subjecting the remainder of the crushed grain to a starch enzymatic hydrolysis and preferably separating out the bran upon completion of the aforementioned treatments.

U.S. Pat. No. 2,289,416 issued to Fine, et al. teaches a process for preparing a cereal from whole grain comprising rupturing the bran coat of the kernels, gelatinizing the starch and then treating the gelatinized starch with a starch splitting enzyme to convert the majority of the starch to dextrins and sugars. After the treatment has been completed (in approximately 2 hours at 60°-70° C.) the converted grain is heated to inactivate the enzyme, dried, tempered and processed to produce a toasted product in flaked, shredded or other desired form.

It is therefore an object of the present invention to hydrolyze polysaccharides and starches present in the cereal grain to effect substantial sweetness in the final cereal product. Another object of the present invention is a process to obtain a self-sweetened food product especially a ready-to-eat breakfast cereal without the addition of sugars.

It is also an object of the present invention to increase the moisture absorption, organoleptic qualities, palatability and texture forming properties of the bran or germ fraction component of the cereal grain to replace the matrix forming properties of the endosperm lost as a result of the in situ conversion of starch and matrix the grain syrup which results from the saccharification of starch.

DISCLOSURE OF THE INVENTION

The present invention involves a new process to produce a sweet, all natural, enzyme-saccharified, cereal derived from cereal grain components.

The process involves in-situ saccharfying the endosperm fraction of a cereal grain to form a syrup containing soluble saccharides and adding to the saccharified endosperm a matrix forming ingredient which is a modified bran material or a toasted ground germ, or a combination of these two ingredients. The addition of one or more of these ingredients to the saccharified endosperm will form a cereal dough which is subsequently processed to obtain a ready-to-eat cereal. Optionally, malted grain or unsaccharified endosperm can be added to the cereal dough for their beneficial flavor contribution.

One of the matrix forming ingredients is a toasted, ground germ produced from the germ fraction of a cereal grain seed. The germ fraction, which contains a high level of high quality protein but which also contains a major amount of bran and oil, is toasted and comminuted for optimum matrix performance and shelf stability. The germ is toasted at from 110° C. to 160° C., preferably from 130° C. to 155° C. for 15 to 175 minutes, preferably from 20 to 30 minutes and then the toasted germ is ground to an average particle size of from 0.25 to 2.0 millimeters. If ground too fine, the bran-free germ will develop off-flavors. Optionally, before the germ is toasted, any bran material present therein is separated out (i.e. by air classification). The bran which is separated out may be combined with the bran fraction, if the modified bran material is to be included as a matrix forming ingredient or the separated bran can be discarded.

In food applications where the oil contained within the germ fraction is not desirable in the final product, such as in a cereal designed to be predominately fat-free, the oil contained within the germ fraction may be separated out by solvent extraction or expulsion prior to toasting.

Alternately, the germ can be separated from the bran fragments preferably by air classification and the full fat germ particles are then bumped, dehydrated and/or toasted. This treatment, by basically maintaining the oil droplets in the natural cell environment, encapsulated by the cell matter that contains desirable natural antioxidants, can result in full fat germ particles with suitable shelf stability in the finished cereal product.

The protein contained within the germ fraction is a useful, functional ingredient which replaces some of the lost functional properties attributable to the starch. The protein acts in its texture promoting role by matrixing with the endosperm syrup. The protein will matrix with the syrup best when the oil content of the germ has been removed prior to the formation of the cereal dough.

The bran fraction either alone or combined with the bran material which was separated out from the ground germ and malt (if these optional embodiment are utilized) must be treated to improve its functionality, if it is to be utilized as a matrix forming ingredient. The bran modification process will produce a bran material which is functional and will possess increased texture-forming properties. Also the modified bran will not have the gritty mouthfeel characteristic of conventional bran containing cereals.

The bran modification process comprises milling the bran fraction to an average particle size of from 5 to 100 microns preferably from 20 to 60 microns. The bran material obtained thereby possesses the desired functionality and texture-forming properties to help replace the starch, which has been saccharified, as the matrix of the cereal. For further disclosure on this second bran modification process, attention is directed to the commonly-assigned, U.S. patent application Ser. No. 457,994 filed on Jan. 14, 1983 entitled Micromilling Of Bran And Product which is herein incorporated by reference.

Malted grain or unsaccharified endosperm may be added to the cereal dough formed when the saccharified endosperm is combined with the modified bran or the toasted ground germ. Malted grain is produced by a process which involves malting an amount of grain and milling the malted grain to a flour consistency. When added to the cereal dough, the malted grain will comprise from 1-15% of the ready-to-eat cereal product. Preferably, bran material is separated from the milled malted grain prior to the addition of the malted grain to the cereal dough. The bran material which is separated out may be added to the bran fraction of the cereal grain to be processed therewith. The addition of unsaccharified endosperm which has been milled to a flour consistency may be added to the saccharified endosperm fraction to aid in matrixing the syrup and for the process benefit.

To effect saccharification of the endosperm, the endosperm fraction which consists primarily of starch, is milled to a particle size less than 2 millimeters for optimal water, heat and enzyme penetration. The milled endosperm, 15 to 60% by weight in a slurry, is cooked by any suitable means until substantially all the starch is gelatinized and then enzymatically hydrolyzed to form soluble saccharides. From 15 to 75% by weight of the endosperm is enzymatically hydrolyzed, preferably from 50 to 60%. At the upper limit of from 60 to 75%, the majority of the starch present in the endosperm is hydrolyzed. The soluble saccharide produced is preferably glucose. The endosperm fraction is enzymatically saccharified until from 7.5 parts sucrose-equivalent sweetness to 50 parts sucrose-equivalent sweetness is present in the final breakfast cereal product, as consumed. Preferably, the endosperm fraction is enzymatically saccharified until from 10 parts sucrose-equivalent sweetness to 45 parts sucrose-equivalent sweetness is present, and most preferably until from 35 parts sucrose-equivalent sweetness to 40 parts sucrose-equivalent sweetness is present in the final breakfast cereal product, as consumed.

The endosperm fraction after milling can be cooked in a number of different ways to effect the substantial gelatinization of the starch present therein. The starch gelatinization of the endosperm fraction may be accomplished by steam injection in a jet cooker at from 140° to 165° C. in the presence of a thermally stable α-amylase for a period of time varying from one second to 60 seconds. The starch gelatinization may also be accomplished by cooking in a pressurized chamber, such as an autoclave or a rotary cooker at 100° to 140° C. for 5 to 60 minutes with or without the addition of a thermally stable α-amylase. Also the dry endosperm starch may be slurried and gelatinized by heating to 110° to 160° C. as in an extruder and then diluted further to give the 15 to 60% by weight concentration of the endosperm prior to enzymatic hydrolysis.

A cereal dough is then obtained by combining the saccharified endosperm with one or more of the matrix forming ingredients, namely the toasted ground germ or the modified bran or a combination of these ingredients. The cereal dough can optionally contain unsaccharified endosperm and malted grain. The cereal dough can be further processed using typical breakfast cereal manufacturing techniques to obtain a ready-to-eat breakfast cereal.

While the hydrolysis of the polysaccharides can be obtained by a variety of enzymes and processes, the preferred process consists of a 1 to 4 hour treatment of cooked or uncooked grain endosperm fractions at 18 to 55% solids. A dual enzymatic reaction involving bacterial α-amylase simultaneously with a fungal glucoamylase is preferred. A pH of from 4.5 to 6.0, preferably 4.8 to 5.2 is utilized and the temperature range will vary from approximately 40°-75° C., preferably from 55° to 70° C.

It is possible to vary the level of sweetness by controlling either the solids concentration or the amount of the incorporated saccharide into the final cereal dough. Additionally, the total sweetness of the cereal product can be controlled by either limiting the enzyme reaction on the starch of the endosperm or by not saccharifying an aliquot of the endosperm fraction. It is not desirable to separate the sweet liquid obtained by the hydrolysis of the endosperm fraction from the residual solids. The residual unreacted endosperm structure, if not physically disrupted by separation, is beneficial in aiding in matrix formation. Additional advantages of this process include the fact that the conversion takes place fairly rapidly and the reaction may take place within a single vessel.

Appropriate cereal grains which may be utilized in conjunction with the present invention include corn, wheat, oat, barley, buckwheat, rye, rice, sorghum, and millet.

Since the endosperm contains approximately 95% of the starch present in the whole grain, it is the only fraction of the whole grain which undergoes enzymatic treatment. Since there is only a low level of the starch component within the malted grain, it is not generally regarded to be economically worthwhile to subject the malt flour to enzymatic treatment. However, the malt flour could be added to the endosperm before gelatinization and saccharification to convert the residual starch in the malt flour into sugar. It is undesirable to treat the germ or fiber fraction enzymatically because off-flavors may develop. Additionally, these fractions contain low levels of starch. The process of the present invention will not produce any off-flavors because the endosperm is enzymatically saccharified separately.

To achieve optimum product quality, some food ingredients which were not necessarily treated for sweetness or fiber functionality. Non-cereal ingredients (i.e., nuts, raisins, honey, etc.) can also be included in the cereal manufacturing process for product desirability.

While it is anticipated that the inventive process will have its greatest utilization in the area of the production of read-to-eat breakfast cereals, other logical product applications other than breakfast cereals would include but not be limited to snack food items, baby foods, main meal items, side dishes, desserts, cake ingredients and as a pet food or pet food ingredient.

The converted ingredients which make up the cereal dough can be further processed using typical breakfast cereal manufacturing techniques, singly, in groupings or in sequences to obtain a marketable ready-to-eat cereal product. In a simple and convenient way, the converted ingredients (modified bran, germ, malt and saccharified endosperm) were combined and dried/toasted on steam drying rolls at a moderately high temperature (approximately 150° C.). This process step reduced the thick slurry of the combined materials into a malty, pleasant tasting, crisp eating, cereal material. When consumed with milk, the flaky cereal as obtained from the drying rolls retained a remarkable crispness in the fluid. Considering the high simple sugar content, this was surprising and unexpected and was found to be due to the presence of the modified fibers of the bran without which the cereal would rapidly developed a limp texture that would soon disintegrate in the milk.

The heat (i.e., drum dryers) was instrumental in developing a desirable composite flavor where the cereal flavor inherent particularly in the bran the nutty flavor of the germ, the sweetness and flavor of the saccharified endosperm and the toasted flavor of the malt combined into a pleasant and high flavor level.

The recombined, converted grain components which make up the cereal dough could be processed into a ready-to-eat cereal several other conventional ways including but not limited to the following methods:

(1) Partially drying the materials of the combined ingredients to a doughy consistency. Forming, extruding the material into pellets on equipment like Buhler or Ambretti extruders, drying the pellets to a yet lower moisture level, flaking the pellets (e.g., on a non-differential flaking mill), and toasting the flakes to a desirable flavor.

(2) Reducing the moisture level of the material to a doughy consistency and forming shapes of choice on a cookie cutter using known techniques followed by toasting the particles.

(3) It is even possible that if the total conversion of the starch of the grain for sweetness is not necessary, an endosperm or starch fraction of the unsaccharified portion of the grain could be recombined with the converted grain fractions, and the material expanded by one of several known techniques.

The present invention can permit the formulation of various ready-to-eat cereals. According to this process, it is possible to select the most functional cereal grain fragments and combine them into a saccharified cereal or alternatively leave out a cereal grain component which in a particular cereal may be undersirable. In contrast to a whole grain cereal, containing levels of starch (present as either saccharified soluble saccharides or as a polysaccharide), bran and germ in the same proportion as present in the starting cereal grain, it is possible to formulate a saccharified cereal containing cereal fractions all from the same grain, e.g. all corn or wheat, but which can contain levels different from the original grain or one can omit the presence of one cereal gain fraction (germ or bran). Furthermore, an enzyme-saccharified cereal can be produced from cereal grain components from different cereal grains. For example, one could choose to saccharify the endosperm fraction of rice because of its neutral flavor, high sweetness yield upon enzyme hydrolysis, combine this with corn germ which is beneficial because its nutty toasted flavor, wheat bran because it will impart a high level of functionality and barley malt because it will impart a preferred flavor.

The invention is further illustrated, but not limited by the following examples:

EXAMPLE I

An all grain cereal was prepared which contained rice endosperm which was saccharified, oat bran, wheat germ and barley malt. The rice endosperm fraction (brewers grits size—2 mm diameter) was slurried at 20% w/w in water and cooked at 121° C. for 30 minutes. Part of the cooked endosperm was saccharified as follows. The pH was adjusted to 5.0 with 3N HCl, the Ca++ level of the solution was brought to 330 ppm and the temperature was controlled at 60° C. Then $\alpha$-amylase, Novo Termamyl T-60 (1.6 ml/kg endosperm) and glucoamylase Miles Diazyme L-100 (6.6 ml/kg endosperm) were added to the stirred slurry. After 2 hours of reaction, 65% of the endosperm weight had been converted to glucose.

The oat bran obtained from National Oats Company was modified by milling it to an average particle size of 40 microns using a combination of a Model M-1 Mill and C-1 Air Classifier manufactured by Vortec Products Company (Long Beach, CA) in the manner disclosed by copending U.S. patent application Ser. No. 457,994 filed on Jan. 14, 1983.

Toasted, milled, solvent-defatted wheat germ purchased from Vitamins, Inc. and milled (20 mesh) carmel barley malt purchased from National Malting Corp. were also incorporated into the cereal.

A ready-to-eat breakfast cereal was prepared by mixing equal amounts of the saccharified rice endosperm prepared above with cooked but ungelatinized, unsaccharified endosperm. To this mixture was added the modified oat bran, the wheat germ and barley malt to prepare a cereal dough which was further processed by drying on steam rolls at 149° C. (300° F.) at 5 rpm. The final dry weight composition of the cereal flakes was 39.5% saccharified rice endosperm, 39.5% cooked rice endosperm, 10.5% oat bran, 5%

The mixture of saccharified and unsaccharified rice endosperm provided the breakfast cereal with a pleasant, but low sweetness level. A pleasant malt flavor was provided by the caramel barley malt. The toasted, defatted wheat germ provided nutrition in the form of protein, nutty flavor notes and matrix material. The modified oat bran provided fiber and matrix material.

EXAMPLE 2

An all grain cereal was prepared which contained saccharified corn endosperm, wheat bran and barley malt. The endosperm fraction (brewers grits size—2 mm diameter) was slurried at 20% w/w in water and cooked at 121° C. for 30 minutes. Part of the cooked endosperm was saccharified as follows. The pH was adjusted to 5.0 with 3N HCl, the Ca++ level of the solution was brought to 330 ppm and the temperature was controlled at 60° C. Then $\alpha$-amylase, Novo Termamyl T-60 (1.6 ml/kg endosperm) and glucoamylase Miles Diazyme L-100 (6.6 ml/kg endosperm) were added to the stirred slurry. After 2 hours of reaction, 65% of the endosperm weight had been converted to glucose.

The light wheat bran was processed by micromilling to an average particle size of 40 microns in the manner described in Example 1. The third ingredient, caramel barley malt was purchased from National Malting Corp.

The saccharified corn endosperm, the light wheat bran and the malted barley were combined to form a cereal dough which was further processed in the manner described in Example 1. The ready-to-eat breakfast cereal flakes which were obtained contained the following percentage dry weight compositioned makeup:

Saccharified Corn Endosperm: 75%
Micromilled Wheat Bran: 15%
Caramel Barley Malt: 10%

The ready-to-eat breakfast cereal had a high fiber content, possessed a high level of sweetness and was a heavily-flavored cereal product due to the high level of incorporation of carmel barley malt.

We claim:

1. A process for preparing an all-grain enzyme-saccharified, ready-to-eat cereal from an endosperm fraction and a bran fraction, or a germ fraction or combination bran and germ fractions which comprises:
   (a) processing the endosperm fraction by:
      (i) milling to a particle size less than 2 millimeters,
      (ii) forming a slurry containing from 15 to 60% by weight of said milled endosperm,
      (iii) cooking the milled endosperm until substantially all the starch is gelatinized, and
      (iv) enzymatically hydrolyzing from 15 to 75% by weight of said processed endosperm to form soluble sacharides such that the ready-to-eat cereal contains from 7.5 parts sucrose-equivalent sweetness up to 50 parts sucrose-equivalent sweetness;
   (b) adding to said hydrolyzed endosperm a matrix forming ingredient which is either a modified bran fraction, a toasted ground germ fraction or combination of these two ingredients thereby forming cereal dough; and
   (c) obtaining a ready-to-eat cereal from said cereal dough.

2. The process according to claim 1 wherein the toasted ground germ fraction is produced by:
   (a) toasting the germ fraction at a temperature of from 110° C. to 160° C. for 15 to 175 minutes; and
   (b) grinding the toasted germ fraction to a particle size of from 0.25 to 2.0 millimeters.

3. The process according to claim 2 wherein the germ fraction is toasted at a temperature of from 130° C. to 155° C. for 20 to 30 minutes.

4. The process of claim 2 wherein the germ fraction is first processed by separating bran material out of said fraction prior to toasting.

5. The process according to claim 2 wherein oil contained within the germ fraction is separated out by extraction or expulsion prior to toasting.

6. The process according to claim 1 wherein the modified bran fraction is produced by milling the bran fraction to a particle size of from 5 to 100 microns.

7. The process according to claim 6 wherein said bran fraction is milled to a particle size of from 20 to 60 microns.

8. The process of claim 1 wherein the enzymatic hydrolysis of the endosperm comprises a treatment process whereby the endosperm at a 18–55% solids content is subjected to the enzymatic action of $\alpha$-amylase simultaneously with fungal glucoamylase at a pH of from 4.5 to 6 at a temperature of 40° to 75° C. for 1 to 4 hours.

9. The process of claim 4 wherein the pH is from 4.8 to 5.2 and the temperature is from 55° to 70° C.

10. The process of claim 1 wherein the ready-to-eat cereal contains from 10 parts sucrose-equivalent sweetness to 45 parts sucrose-equivalent sweetness.

11. The process of claim 10 wherein the ready-to-eat cereal contains from 35 parts sucrose-equivalent sweetness to 40 parts sucrose-equivalent sweetness.

12. The process according to claim 1 additionally comprising the steps of:
   (a) malting a cereal grain;
   (b) milling the malted grain to a flour consistency; and
   (c) adding said malted grain flour to the cereal dough such that the ready-to-eat cereal will contain from 1 to 15% of said malted grain flour.

13. The process of claim 12 wherein bran material is separated from the milled malted grain prior to the addition of the malted grain to the cereal dough.

14. The process according to claim 1 wherein the endosperm fraction, bran fraction and germ fraction are obtained from corn, wheat, oats, barley, rye, buckwheat, rice, sorghum or millet and where the ready-to-eat cereal contains levels of said fractions which are different than levels present in a whole cereal grain.

15. The product produced by the process of claim 1.

* * * * *